US005205585A

United States Patent [19]

Reuber et al.

[11] Patent Number: 5,205,585
[45] Date of Patent: Apr. 27, 1993

[54] OCCUPANT SAFETY DEVICE FOR AUTOMOTIVE VEHICLES

[75] Inventors: Gerhard Reuber, Drolshagen; Achim Braun, Numbrecht; Horst Stupperich; Manuela Kahlert, both of Bergneustadt, all of Fed. Rep. of Germany

[73] Assignee: Alfred Teves GmbH, Frankfurt, Fed. Rep. of Germany

[21] Appl. No.: 674,373

[22] PCT Filed: Jul. 4, 1990

[86] PCT No.: PCT/EP90/01066
§ 371 Date: Apr. 10, 1991
§ 102(e) Date: Apr. 10, 1991

[87] PCT Pub. No.: WO91/02669
PCT Pub. Date: Mar. 7, 1991

[30] Foreign Application Priority Data

Aug. 18, 1989 [DE] Fed. Rep. of Germany ....... 3927265

[51] Int. Cl.⁵ .............................................. B60R 21/13
[52] U.S. Cl. ................................... 280/753; 297/403; 297/410
[58] Field of Search ....................... 280/751, 753, 756; 297/403, 410

[56] References Cited

U.S. PATENT DOCUMENTS

| 3,292,726 | 12/1966 | Jette et al. | 280/756 |
| 3,420,572 | 1/1969 | Bisland | 280/753 |
| 4,592,571 | 6/1986 | Baumann et al. | 280/756 |
| 5,056,816 | 10/1991 | Lutze et al. | 280/756 |
| 5,066,040 | 11/1991 | Dangl et al. | 280/756 |

FOREIGN PATENT DOCUMENTS

| 2545840 | 4/1977 | Fed. Rep. of Germany . |
| 3723378 | 1/1989 | Fed. Rep. of Germany . |
| 3822461 | 1/1990 | Fed. Rep. of Germany . |
| 9001215 | 5/1990 | Fed. Rep. of Germany . |

Primary Examiner—Kenneth R. Rice
Attorney, Agent, or Firm—Robert P. Seitter; J. Gordon Lewis

[57] ABSTRACT

An occupant safety device for automotive vehicles is proposed which saves mounting space and which is comprised of a roll bar (2, 33, 34) allowing both to be brought into its extended final operative position by a signal being generated in the event of severe impact by means of elastic prestressing means (13, 27) and to be adjusted into the extended final operative position or into the final lowered position by means of an additional drive (5, 6, 7, 8, 9, 17, 18), the movement of the roll bar (2, 33, 34) taking place substantially in a plane which runs at right angles relative to the longitudinal axis of the vehicle, and that at least one headrest (15) is provided at the roll bar (2, 33, 34).

15 Claims, 4 Drawing Sheets

C-C

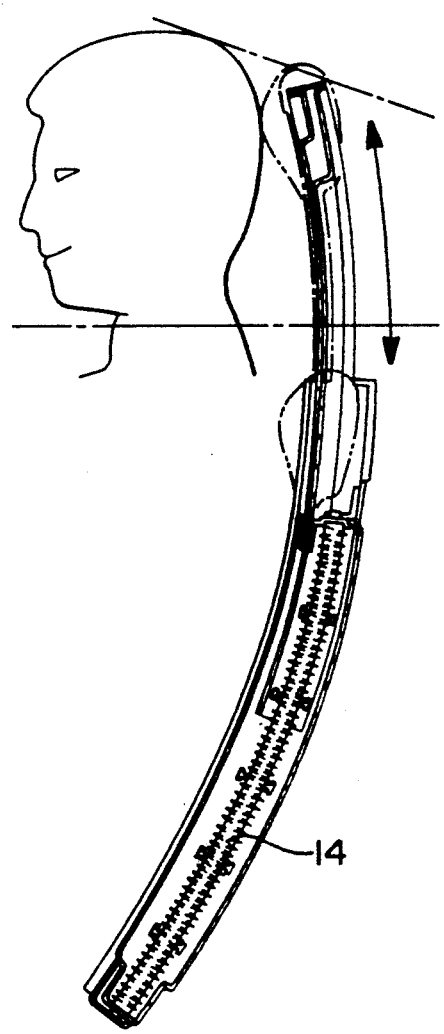
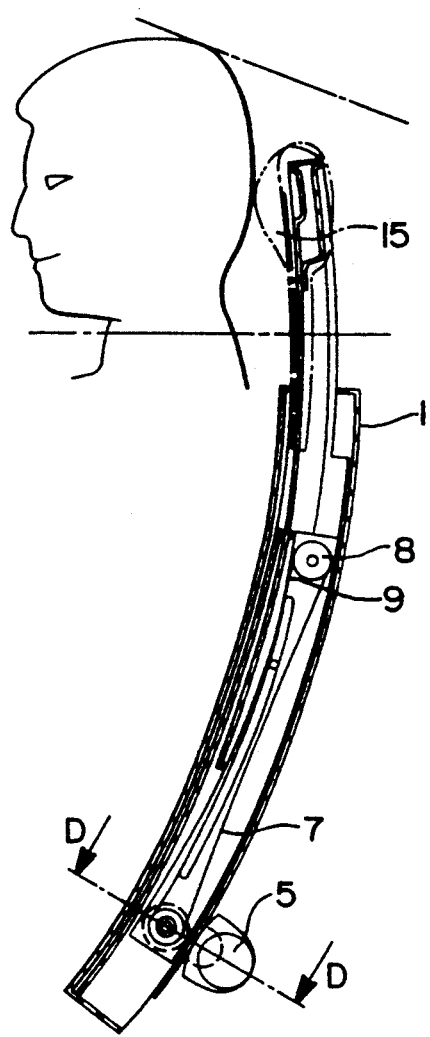
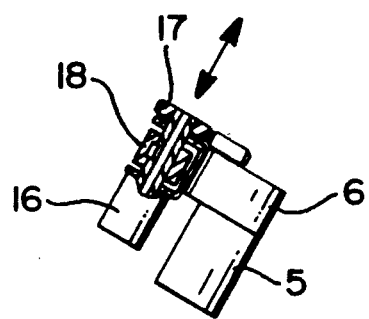

OCCUPANT SAFETY DEVICE FOR AUTOMOTIVE VEHICLES

BACKGROUND OF THE INVENTION

The invention is related to an occupant safety device in accordance with the general description set forth in patent claim 1. A device of this kind is known from the European patent application No. 309 686. This device has the disadvantage of requiring much mounting space and, in addition, does not, due to functional reasons, offer the possibility to actuate an adjustable headrest with the same drive.

BRIEF DESCRIPTION OF THE INVENTION

The invention has, therefore, the object to create a compact safety device for automotive vehicles which is comprised of a headrest as an integrated component. According to the invention, this object is attained by the characteristic features put forth in patent claim 1.

A safety device is created by the inventive solution which is suited, in particular, for automotive vehicles of convertible type. The vehicle can be driven with lowered roll bar-headrest unit, as a result whereof annoying wind noises are avoided, but the unit is extended into operative position within fractions of a second in the event of a crash, whereby the headrest will, on one hand, be positioned and the roll bar driven upwardly will, on the other hand, protect the occupants in the event of a rollover. In a preferred embodiment of the invention, it is envisaged that the roll bar is adjustable into at least one intermediate position, that is to say, into a position between the lowered position and the upwardly extended final position. In this way, an optional adjustment of the headrest into a position being comfortable for the occupants will also be possible. In the event of a crash, the additional drive is uncoupled and the roll bar is pushed out into its final operative position.

A particular effect in regard of the safety of the vehicle occupants is achieved in that means are provided which tighten a safety belt when the roll bar is being extended into its final operative position, that is to say, in the event of a crash.

BRIEF DESCRIPTION OF THE DRAWINGS

Further advantageous features, as well as the mode of functioning of the invention will be revealed by the under mentioned description of preferred embodiments made with reference to the accompanying drawings, in which:

FIG. 2, shows a section along the line A—A in FIG. 1;

FIG. 3, shows a section along the line B—B in FIG. 1;

FIG. 5, shows a section along the line D—D in FIG. 3;

DETAILED DESCRIPTION OF THE EMBODIMENT OF THE INVENTION

Figure 1:
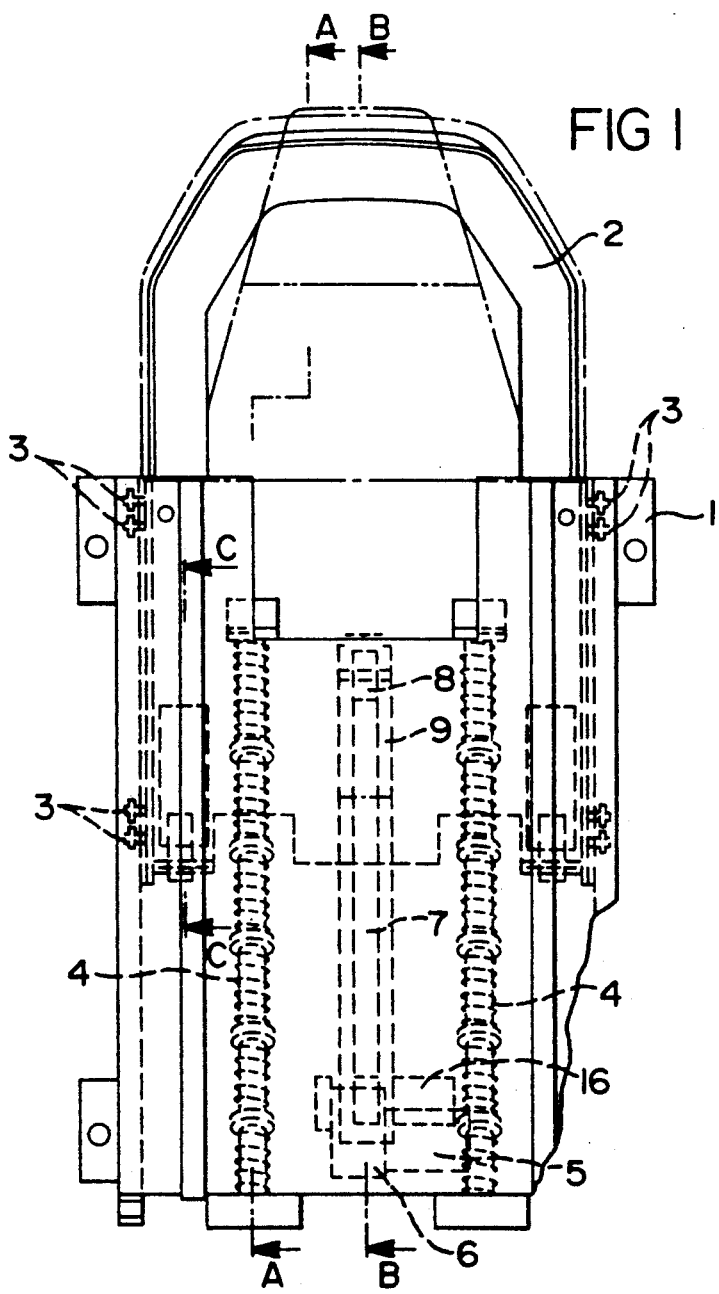
FIG. 1, shows a first embodiment of the invention.

According to FIG. 1, the a safety device is comprised of a housing 1 made up of shaped sheet or plate steel parts which is screwable or boltable to a host vehicle body and which is arranged behind each of the rear seats of a four seat convertible-type automotive vehicle. In said housing 1, a roll bar 2 is slidably supported by means of guide rollers 3. The roll bar is prestressed into the upwardly moved position by two spring elements 4 containing compression springs. Between the two spring elements 4, a driving unit is disposed which comprises an electric motor 5, gearing 6, a toothed belt 7, and a pinion 8, the latter engaging a toothing 9 provided at the roll bar 2. The electric motor 5, the gearing 6, and the pinion 8 are rigid with the housing.

Figure 4:
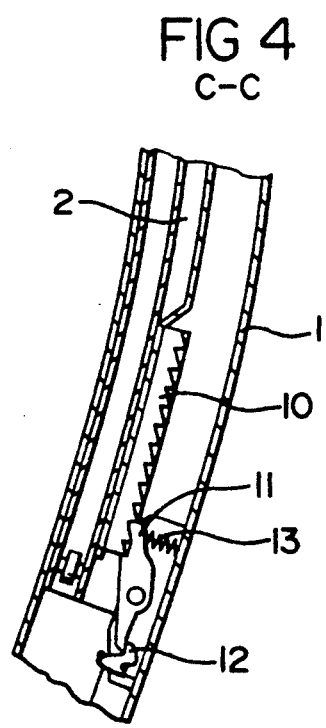
FIG. 4, shows a section along the line C—C in FIG. 1.
Figure 8:
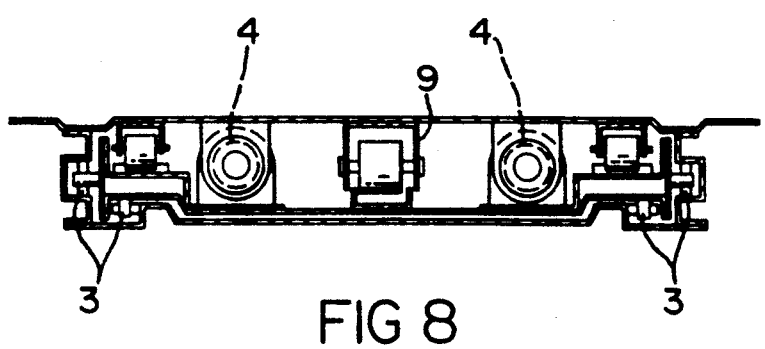
FIG. 8, shows a horizontal cross-section of the bottom half of FIG. 1.

As seen in FIG. 4, in the range of each of the two lateral guides the roll bar is furnished with a rack 10 which is engaged by a spring-loaded ratchet 11 which is rigid with the housing. Said ratchet 11 safeguards the roll bar against the inward movement. The ratchet 11 can be disengaged by an actuating element 12 against the force of a spring 13, so that this direction of movement will be released in the event of the intentional lowering of the roll bar.

Due to the ratchet 11 and to the toothed rack 10, it will be safeguarded at all times that the roll bar is secured in every intermediate position against any inward movement into the housing 1.

As seen in FIGS. 2 and 3, the roll bar moves on a curved guide track. Owing to this measure, a particularly small mounting space is required. Spring guide rods 14 which are surrounded by the compression springs of the spring element 4 extend in accordance with the radius of curvature of the housing 1 and of the roll bar 2.

In FIG. 2, both the completely lowered and the maximum final extended operative position of the roll bar 2 are shown. Said roll bar 2 is furnished with a headrest pad 15 which can be adjusted by means of the drive into a comfortable position in accordance with the stature of the relevant occupant. If and when, for example, in a fourseat convertible-type automotive vehicle there are no occupants seated on the rear seats, then the driver will adjust the rear roll bars into the lowered position, as a result whereof any annoying wind noises will be avoided.

In the event of a severe impact, crash sensors will generate an actuating signal which will actuate the lifting solenoid 16 such that the toothed belt 7 is uncoupled from the gearing 6. For this purpose, the lifting solenoid 16 will disengage the shaft of a toothed-belt drive 18 from a toothed wheel 17, a prior-art coupling with radially slidable spherical elements being provided between the shaft and the toothed wheel, said spherical elements engaging both the shaft and the toothed wheel 17 in the coupled condition.

When the gearing 6 becomes uncoupled from the toothed-belt drive 18, the roll bar driven by the spring elements 4 will be ejected out of the housing 1 into its maximum upright position. In this context, the headrest pad 15 is dimensioned such as to be adapted to protect the head of the relevant occupant also in the upwardly moved operative position of the roll bar.

Not illustrated in the drawing is a mechanical coupling of the roll bar with a fixing point of the safety belt by means of which the safety belt is tightened when the roll bar is being moved into the operative position. In this configuration, coupling is made by interposing of a transmission gearing by which the movement for tightening of the safety belt allows to be adjusted to an appropriate measure.

Figure 6:
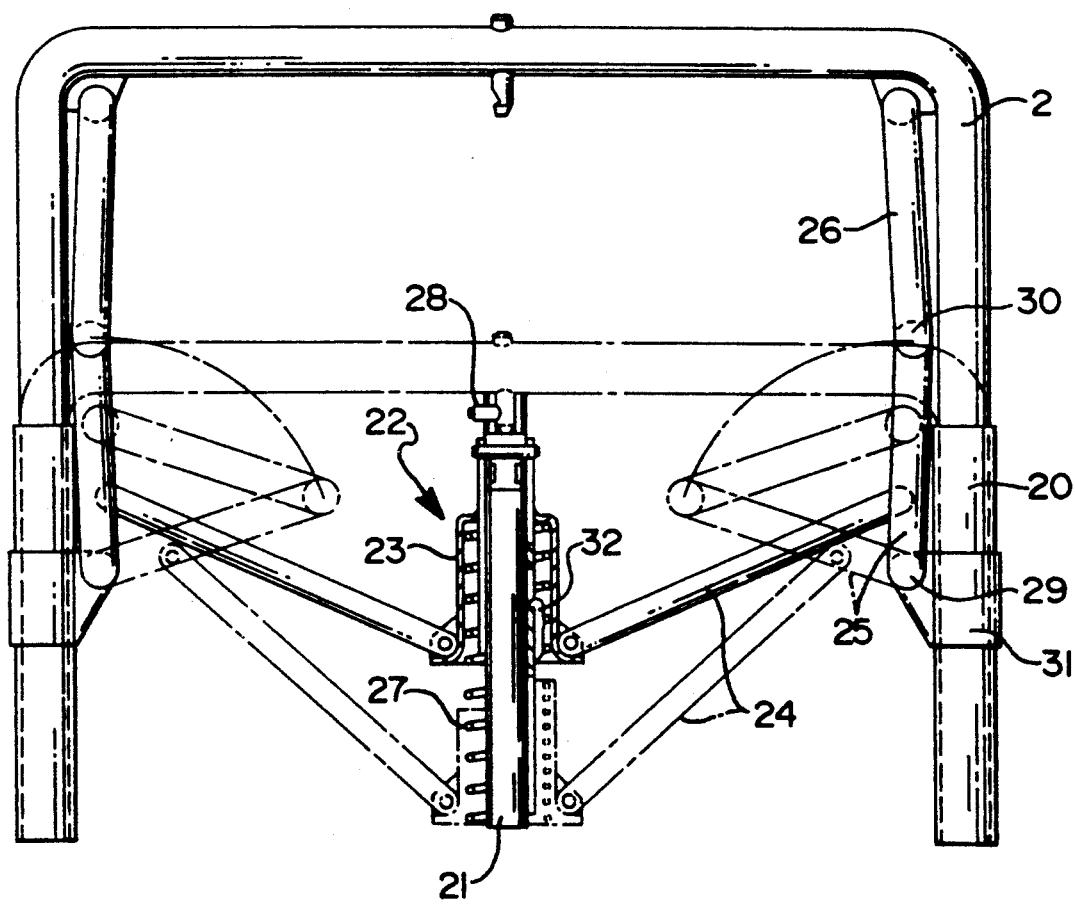
FIG. 6, shows a second embodiment of the invention.

FIG. 6 shows a safety device featuring a straight lifting movement, in which the headrest pads are not illustrated. The U-shaped roll bar 2 is guided with each of its two legs telescope-type in a stand pipe 20. Said stand pipes 20 are rigidly coupled to the vehicle body. Between the two stand pipes 20, a guide column 21 of a drive 22 is provided which transmits the actuating power through a sleeve-shaped transmission element 23 and through levers 24-26 to the roll bar 2. Said transmission element 23 is axially slidingly supported on the guide column 21 and is prestressed in vertically upward direction by a spring 27.

In the completely lowered condition, the roll bar 2 is locked by the locking device 28. Said locking device 28 is released both in the event of a severe impact and of an intentionally controlled adjustment of the roll bar.

In FIG. 6, the completely lowered safety device is shown by dash-dotted lines. The driving and coupling mechanism having a symmetrical set-up is each comprised of a lever 24 which is swingably pivoted, on one hand, on the transmission element and is coupled, on the other hand, between a bearing point 29 and a joint 30 of the lever 25, to the latter. Said bearing point 29 is disposed at an external flange 31 which is rigidly coupled to the stand pipe 30. By the joint 30 which is positioned at the other end of the lever 25 the latter is coupled to one end of the lever 26, which is supported with its opposite end in the associated bending range of the roll bar 2. The stroke of the drive 22 is geared into an accordingly larger stroke of the roll bar by an appropriate selection of the dimensions of said levers.

Said drive 22 is furnished with hydraulic, pneumatic, mechanical or electromechanical means —for example, in accordance with the drive illustrated in FIGS. 1 to 5 —for the retraction of the roll bar and for its intentional positioning into the operative position.

The drive is, furthermore, furnished with a safety bolt 32 which engages associated recesses of the guide column 21 and which prevents any inward movement of the roll bar. As to its function, said safety bolt corresponds to the ratchet 11 and is brought into the unlocking position when necessary (retraction of the roll bar) by appropriate actuating means.

Figure 7:
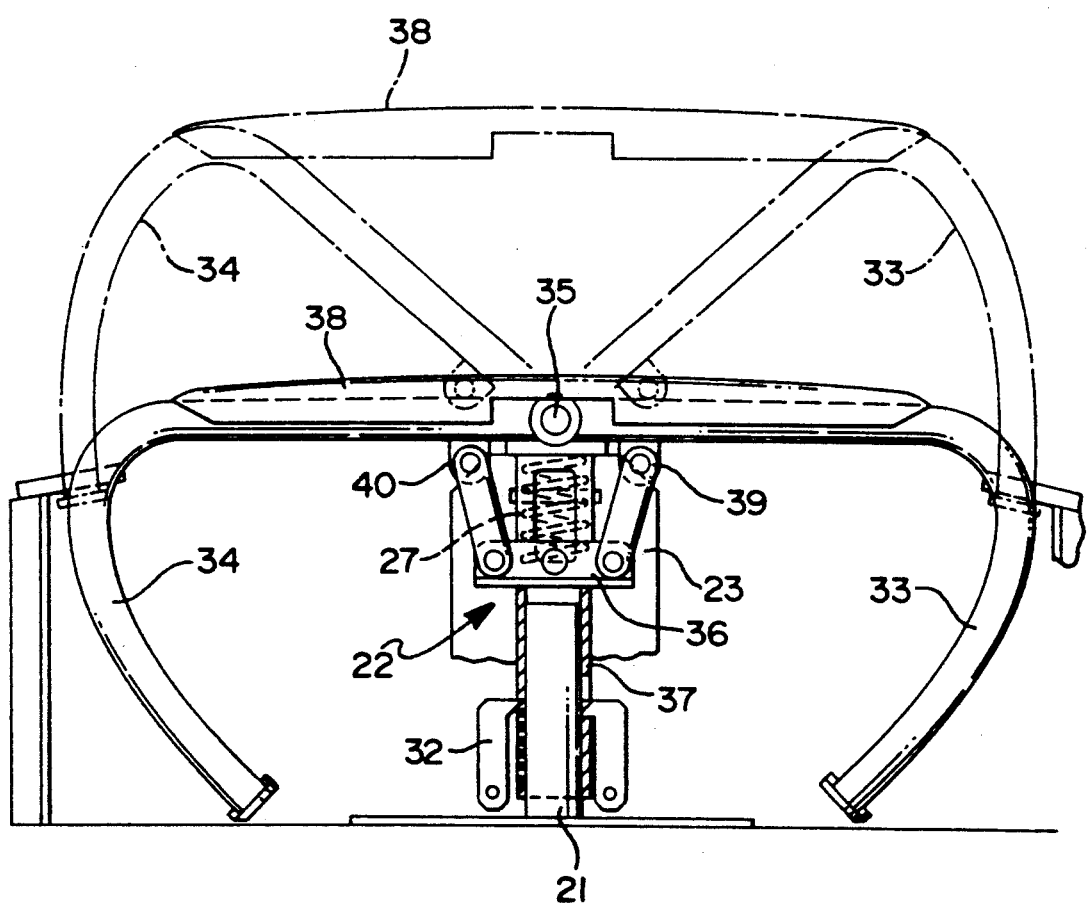
FIG. 7, shows a third embodiment of the invention.

The embodiment according to FIG. 7 consists of a two-part roll bar, the two parts 33, 34 being swingable about a common axis 35. By and large, the drive 22 corresponds to that shown in FIG. 6 and is coupled to the two roll bar parts 33 and 34 through the bearing points 39, respectively 40. The corresponding transmission element 23 is supported on the guide column 21 and is prestressed in the direction of the extended operative position by the spring 27. Said spring 27 takes support at supporting body 36 which is coupled to the guide column 21. Sleeve-shaped section 37 of the transmission element 23 is formed with recesses which are engaged by safety bolts 32 in order to prevent any movement of the roll bar.

On the two parts 33, 34 of the roll bar, a transverse truss 38 may be positioned which constitutes an additional safety means for the vehicle occupants, on one hand, if in the event of a rollover the vehicle should, unfortunately, happen to hit a projecting obstacle and, on the other hand, it can serve for the fixation of luggage on the roof (ski holders etc.). Reasonably, said transverse truss 38 is swingably pivoted on one of the two parts 34, 33, while it is slidingly guided in the other part, for example, by means of an oblong-hole-and-stud coupling.

We claim:

1. An occupant safety device for automotive vehicles comprising a roll bar displaceable from a lowered position to an extended operative position in response to a signal generated during a vehicle crash by preloaded resilient means and selectively positionable between a stowed position and said extended position, wherein movement of the said roll bar takes place substantially in a plane which runs at right angles relative to the longitudinal axis of the vehicle, and in that at least one headrest is displaceable with said roll bar.

2. An occupant safety device as claimed in claim 1, characterized in that the said roll bar is adjustable into at least one intermediate position between the stowed and the extended operative positions.

3. An occupant safety device as claimed in claim 1, characterized in that the said roll bar is coupled to the said drive by a lever mechanism.

4. An occupant safety device as claimed in claim 1, characterized in that the said roll bar is provided behind a back of a rear seat bench of the vehicle.

5. An occupant safety device as claimed in claim 1, characterized in that one roll bar is associated with each one of the seats.

6. An occupant safety device as claimed in claim 1, characterized in that the plane in which the said roll bar moves is curved.

7. An occupant safety device as claimed in claim 6, characterized in that a concave side of the said plane faces an associated vehicle seat.

8. An occupant safety device as claimed in claim 1, characterized in that the movement of the said roll bar is a lifting movement with a substantially straight path of motion.

9. An occupant safety device as claimed in claim 1, characterized in that the movement of the said roll bar is a lifting movement with a curved path of motion.

10. An occupant safety device as claimed in claim 1, characterized in that the movement of the said roll bar is a swinging movement about an axis of swing running parallel to the longitudinal axis of the vehicle.

11. An occupant safety device as claimed in claim 10, characterized in that two said roll bars are provided which are swingable about a common axis of swing.

12. An occupant safety device as claimed in claim 1, characterized in that a plurality of said roll bars are displaceable by a common driving unit.

13. An occupant safety device as claimed in claim 1, characterized in that a plurality of independently adjustable to roll bars are disposed in a single vehicle.

14. An occupant safety device as claimed in claim 1, characterized in that the said roll bar unit is integrated into an associated vehicle seat.

15. An occupant safety device as claimed in claim 1, characterized in that the said roll bar comprises a plurality of telescoping lifting elements.

* * * * *